(12) United States Patent
Klintberg

(10) Patent No.: US 10,269,461 B2
(45) Date of Patent: Apr. 23, 2019

(54) DEVICE AND METHOD FOR CLEANING SURFACES

(75) Inventor: John Klintberg, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 940 days.

(21) Appl. No.: 14/240,837

(22) PCT Filed: Aug. 16, 2012

(86) PCT No.: PCT/EP2012/066017
§ 371 (c)(1),
(2), (4) Date: May 20, 2014

(87) PCT Pub. No.: WO2013/030005
PCT Pub. Date: Mar. 7, 2013

(65) Prior Publication Data
US 2014/0246050 A1    Sep. 4, 2014

(30) Foreign Application Priority Data
Aug. 26, 2011   (SE) ...................... 1150773

(51) Int. Cl.
*G21C 19/00* (2006.01)
*G21F 9/00* (2006.01)
(Continued)

(52) U.S. Cl.
CPC ............. *G21C 19/00* (2013.01); *G21C 17/01* (2013.01); *G21C 17/013* (2013.01); *G21C 19/07* (2013.01); *G21F 9/001* (2013.01); *G21F 9/004* (2013.01); *G21F 9/005* (2013.01)

(58) Field of Classification Search
CPC ...... G21C 17/01; G21C 17/013; G21C 19/07; G21C 19/00; G21F 9/004; G21F 9/005; G21F 9/001
See application file for complete search history.

(56) References Cited

U.S. PATENT DOCUMENTS 5,337,434 A * 8/1994 Erlich ................... E04H 4/1654
                                                     15/1.7
5,852,984 A * 12/1998 Matsuyama ........... G21C 17/01
                                                     114/222
(Continued)

FOREIGN PATENT DOCUMENTS

EP    0787646 A2    8/1997
EP    0990750 A2    4/2000
(Continued)

OTHER PUBLICATIONS

International Preliminary Report on Patentability from corresponding PCT Application No. PCT/EP2012/066017, dated Dec. 20, 2013.
(Continued)

*Primary Examiner* — Alexander Markoff
(74) *Attorney, Agent, or Firm* — Murtha Cullina LLP

(57) ABSTRACT

A device for submersibly cleaning surfaces inside a nuclear reactor includes a pump and a nozzle connected to said pump. The nozzle is arranged to face surfaces to be cleaned. The device includes cleaning means capable of removing debris on surfaces to be cleaned. The device includes adjustable flotation means, capable of adjusting the flotation capability of the device depending on a type of cleaning application.

8 Claims, 5 Drawing Sheets

(51) Int. Cl.
  *G21C 17/01* (2006.01)
  *G21C 17/013* (2006.01)
  *G21C 19/07* (2006.01)

(56) References Cited

U.S. PATENT DOCUMENTS

| | | | | |
|---|---|---|---|---|
| 6,099,658 | A * | 8/2000 | Porat | E04H 4/1654 134/167 R |
| 2008/0125943 | A1* | 5/2008 | Finezilber | E04H 4/1654 701/51 |
| 2012/0243649 | A1* | 9/2012 | Shimamura | G21C 17/007 376/249 |

FOREIGN PATENT DOCUMENTS

| | | | |
|---|---|---|---|
| JP | 63111988 A | 5/1988 | |
| JP | H02143199 A | 6/1990 | |
| JP | 05254485 A | 10/1993 | |
| JP | H0915376 A | 1/1997 | |
| JP | 9236688 A | 9/1997 | |
| JP | H10253797 A | 9/1998 | |
| JP | 2004219355 A | 8/2004 | |
| JP | 2005315709 A | 11/2005 | |
| JP | 2007308973 A | 11/2007 | |
| JP | 2010107274 A | 5/2010 | |
| WO | 2005035909 A1 | 4/2005 | |

OTHER PUBLICATIONS

Notification of Reasons for Rejection issued in corresponding Japanese Application No. JP 2014-526452 dated Nov. 22, 2016, pp. 1-5.

Notice of Reasons for Rejection issued in corresponding Japanese Application No. 2014-526452, dated Aug. 8, 2017, pp. 1-5.

* cited by examiner

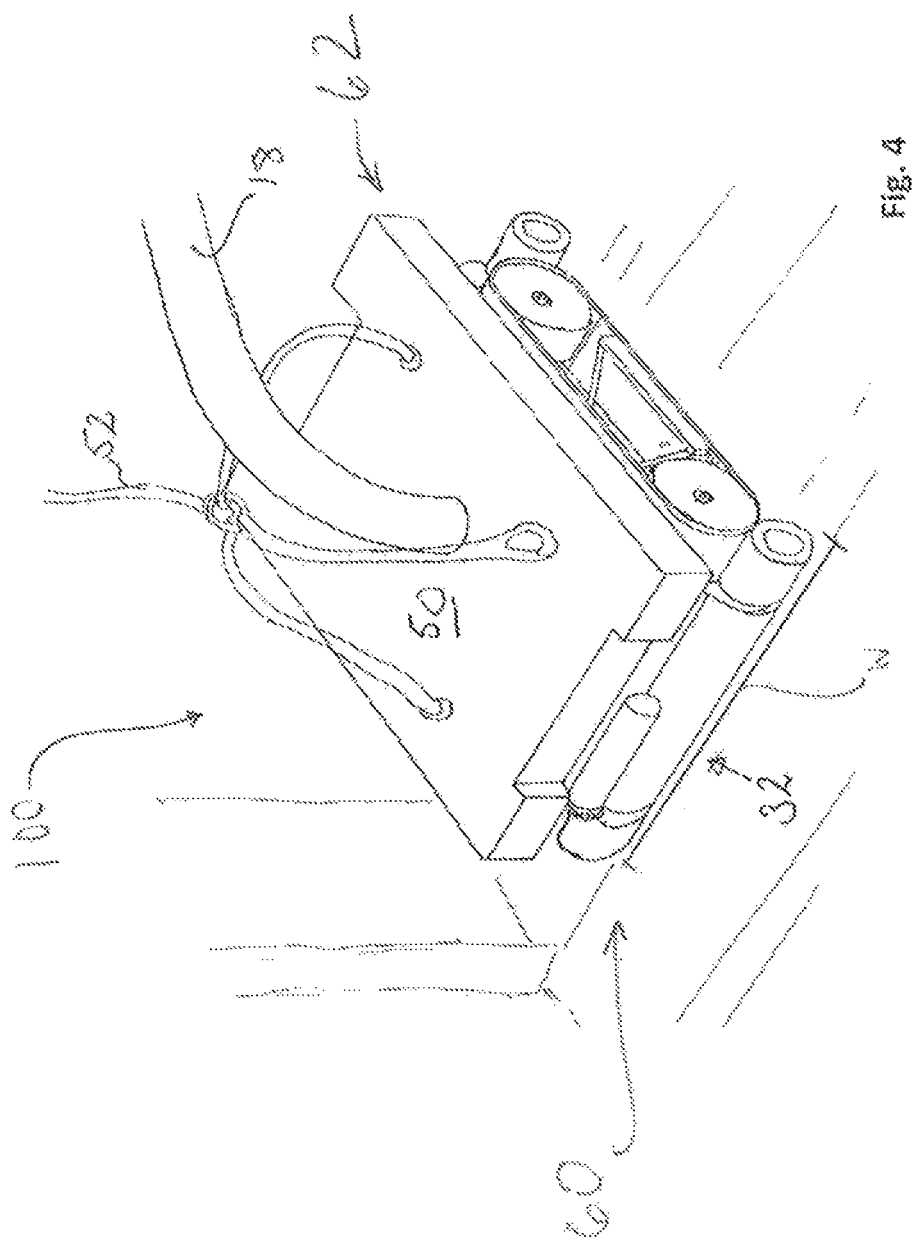

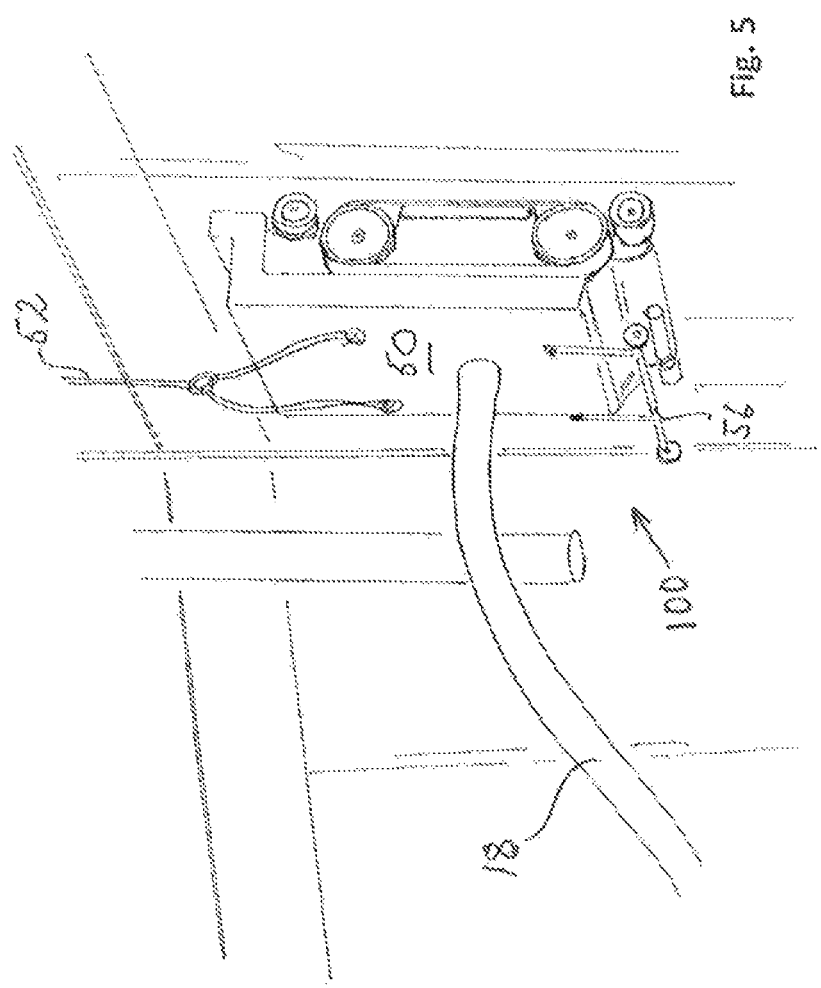

DEVICE AND METHOD FOR CLEANING SURFACES

FIELD OF THE INVENTION

The present invention relates to a device and method for cleaning surfaces within the nuclear industry and in particular surfaces that are placed in liquid in a nuclear power plant or repository for spent nuclear fuel.

BACKGROUND

In a nuclear plant, the reactor and fuel storage pools contain pure water and the overall environment in the pools are to be kept as clean as possible. However, when for example the reactor is in use, a certain amount of radioactive debris and particles, such as crud from the fuel rods or metal chips from wear on reactor components, circulate in the pool and water system and will deposit on surfaces such as floor surfaces and wall surfaces of pools and pipes.

These surfaces need to be cleaned at certain predetermined intervals in order to maintain a high level of cleanliness. The normal procedure is to empty the water from the pools and to clean the surfaces manually with mechanical cleaning devices such as brushes or sponges as well as with high pressure water.

Certain objections have been raised regarding these cleaning methods because they are time consuming and expose workers to radiation. It is also important to clean these surfaces as much as possible since aerosols are liberated when lowering the water level. This may adversely affect persons in this environment and demands have been made to reduce the exposure due to contaminants introduced into in the environment by aerosol.

A number of devices have been developed that may perform cleaning of surfaces with reduced labour and also without the need to empty the pools. However, these types of devices are specifically designed to move around on the floor and cannot be used on vertical surfaces. Other types of cleaning devices are designed for cleaning vertical walls, but do require additional equipment in order to be able to move around, such as lifting devices.

In general the devices developed are not suited for nuclear environments, i.e. chemical, mechanical and electrical requirements on equipment and material to be used in the nuclear environment. Thus there are still improvements to be made in this area.

SUMMARY

The aim of the present invention is to remedy the drawbacks of the state of the art and to provide a cleaning device that is adapted to the specific environment where it is to be used and is versatile enough to handle both horizontal and vertical surfaces to be cleaned.

There is disclosed herein a device for submersible cleaning of surfaces inside a nuclear power plant. The device includes a pump, a nozzle connected to the pump and arranged to face surfaces to be cleaned. The device includes cleaning means capable of removing debris on surfaces to be cleaned. The device includes one or more adjustable flotation means, capable of adjusting the flotation capability of the device depending on cleaning application.

The flotation means provides for the altering of the behaviour of the device depending on if it is to be cleaning a horizontal surface or a vertical surface. On a horizontal surface, same weight is preferable, but not too much as it otherwise will make the device difficult or heavy to control and to propel. On the other hand, if generally vertical surfaces are to be cleaned, it is preferable that the device is weight balanced to float or to be weight neutral in water, in order to facilitate the operation along the walls and for safe recovery in case contact is lost with the device during operation.

According to one solution, the flotation means comprises exchangeable flotation bodies having different flotation capabilities. One body having one flotation capability is replaceable with another body displaying a different flotation capability. In one embodiment, the flotation means includes a fillable volume capable of containing different volumes of flotation gas. The flotation capabilities are alterable by adding or removing gas from the volume.

According to one preferable solution according to the present invention, the cleaning mechanism includes cleaning members capable of directing the removed debris towards the nozzle. This facilitates collection of the debris and dirt removed by the cleaning mechanism, thereby also reducing the risk that removed debris is spread in the water of the pool or other volume where the device is being operated.

In one embodiment, the cleaning mechanisms include rotatable members in contact with the surface to be cleaned. The rotating movement is advantageous in that it is accomplished by drive motors, and also that the rotation causes the removed debris in a certain direction. Preferably, one cleaning mechanism is applied on each of two opposite sides of the device, which collect debris and particles from two directions. Alternatively, a front mechanism collect and move debris towards the nozzle while the rear mechanism prevents debris from leaving the device even though the nozzle may miss a fraction of the collected debris.

In one embodiment, the rotatable members include several different materials and designs such as comprise brushes, sponges, rakes or the like depending on the application and its the requirements and on the type of surface.

As an alternative, or in addition, the cleaning mechanisms comprise nozzles capable of ejecting liquid or gas under high pressure, which nozzles are arranged on rotatable carriers.

Furthermore, indirect mechanical techniques can be applied such as ultrasonic cleaning or pulsed laser cleaning, where cavitations or compressed air bubbles are generated to remove debris.

Preferably the device includes further a remote control system for controlling the driving of the device, thereby improving the working conditions for the operator.

With the present invention, it is feasible to further arrange it with a positioning system capable of tracking and storing the actual position of the device during the cleaning operation. Also additional sensors and devices capable of collecting data and information during the cleaning operation may be added to the device of the present invention. There may for example be graphical presentations displaying areas that have been cleaned and areas that are yet to be handled.

These and other aspects of, and advantages with, the present invention will become apparent from the following detailed description of the invention and from the accompanying drawings.

BRIEF DESCRIPTION OF THE DRAWINGS

In the following detailed description of the invention, reference will be made to the accompanying drawings, of which

FIG. 3 is a cross-sectional view of the cleaning member of FIG. 2a;

FIG. 4 is a perspective view of the embodiment of FIG. 1, shown cleaning a horizontal surface; and FIG. 5 is a perspective view of the embodiment of FIG. 1, shown cleaning a vertical surface.

DETAILED DESCRIPTION

A non-limiting example of the present invention will be described below in conjunction with the accompanying drawings.

Figure 1:
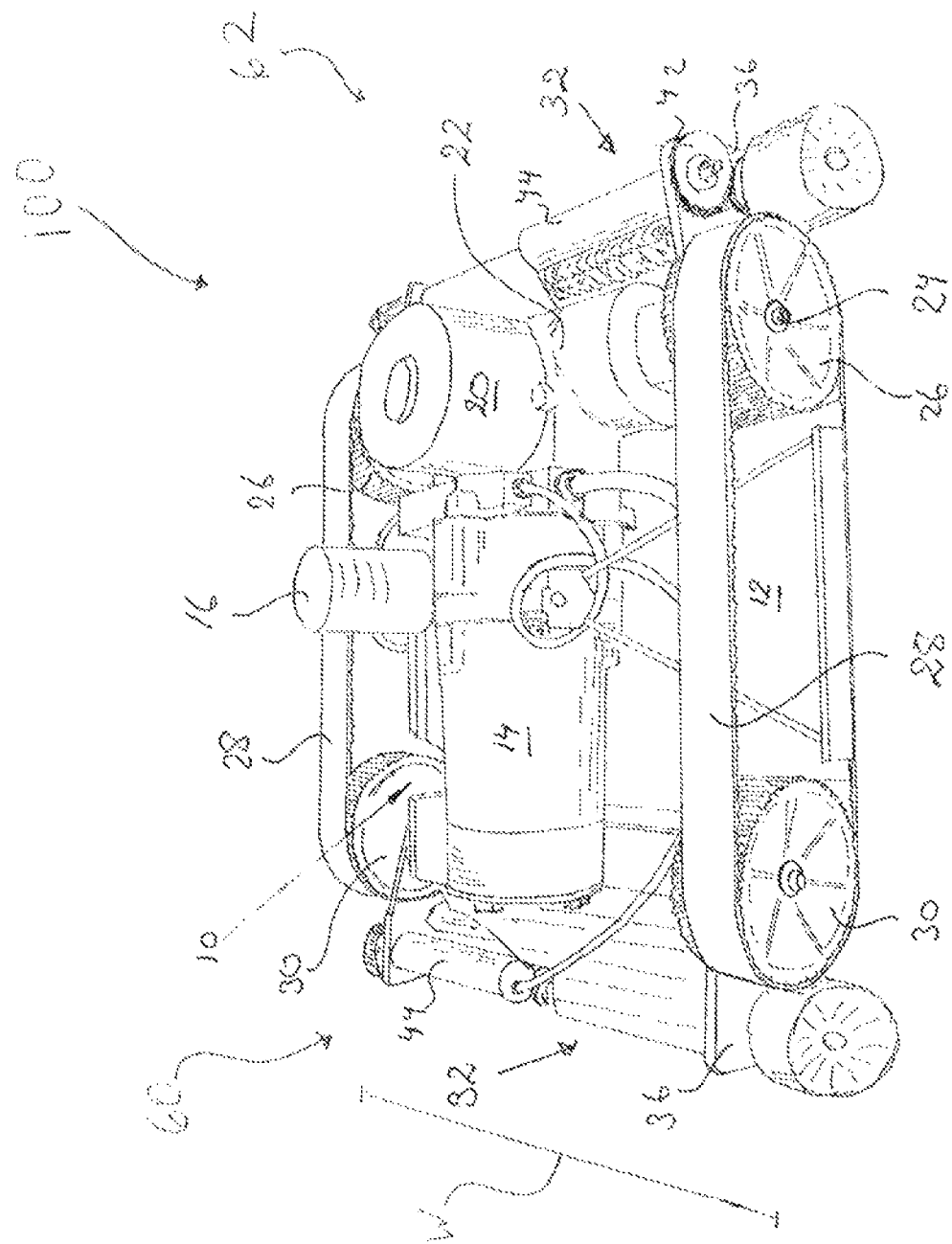
FIG. 1 is a perspective view of one embodiment of the present invention having certain details removed for clarity.

Referring to FIG. 1, a device 100 for submersibly cleaning surfaces in a liquid in a nuclear power plant or repository for spent nuclear fuel includes a frame or the like central support 10. A plate 12 is attached to the central support 10. The plate 12 is arranged with at least one opening (not shown), preferably centrally, and the plate is formed such around that at least one opening that a nozzle is formed, facing downwards in FIG. 1, or functions as a suction nozzle as will be described below.

A pump 14 is connected to the opening preferably via tube or hose. The pump 14 is capable of creating a high suction action at the nozzle. The pump is arranged with an outlet passage 16, which is connectable to a flexible conduit or hose 18, FIGS. 4 and 5. The hose 18 is then preferably connected to a purpose built filter, a collecting vessel or the like.

The device 100 is further arranged with propelling means. The propelling means comprises in the embodiment shown an electric motor 20 attached to the frame and/or the pump 14. Preferably the electric motor 20 is drivably connected to a gear box 22. The gear box 22 is in turn arranged with two output shafts 24, which extend to the each side of the gear box. To each end of the shaft 24, a drive wheel 26 is arranged. The drive wheels 26 are arranged with profiles on their outer circumferences, like ledges. These ledges cooperate with corresponding ribs arranged on inner surfaces of drive caterpillar tracks 28. These tracks 28 also run along support wheels 30 arranged on shafts on the opposite side of the nozzle 12.

At the both shafts of the propelling means, cleaning mechanisms 32 are arranged. Still referring to FIG. 1, one cleaning mechanism 32 is arranged on a first end 60 of the device 100 and a second cleaning mechanism 32 is arranged on an opposing second end 62 of the device. As shown in FIG. 1, each cleaning mechanism 32 spans a width W of the device 100.

Figure 2A:
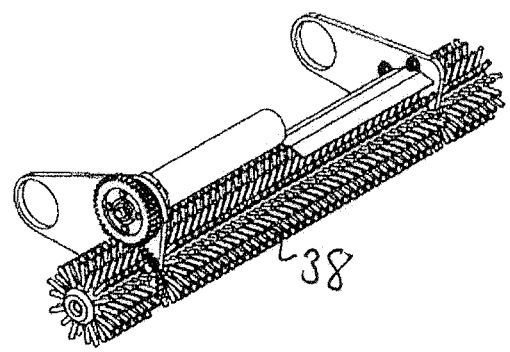
FIG. 2a illustrates a cleaning member utilized with the present invention.
Figure 2B:
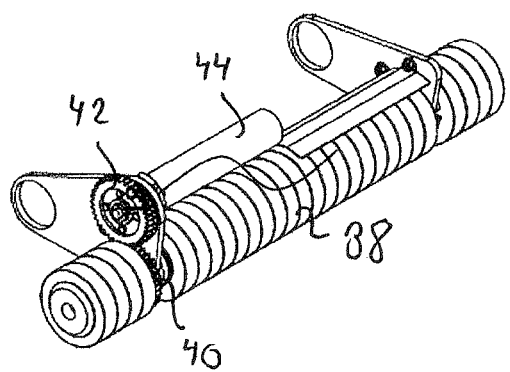
FIG. 2b illustrates a cleaning member utilized with the present invention.
Figure 2C:
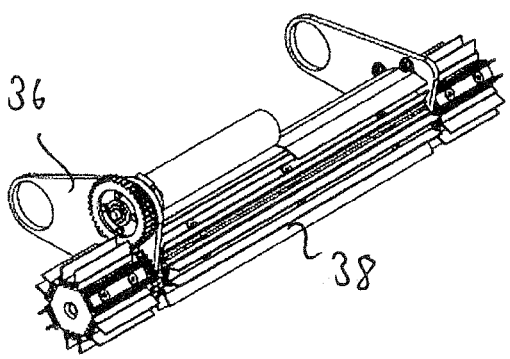
FIG. 2c illustrates a cleaning member utilized with the present invention.
Figure 3:
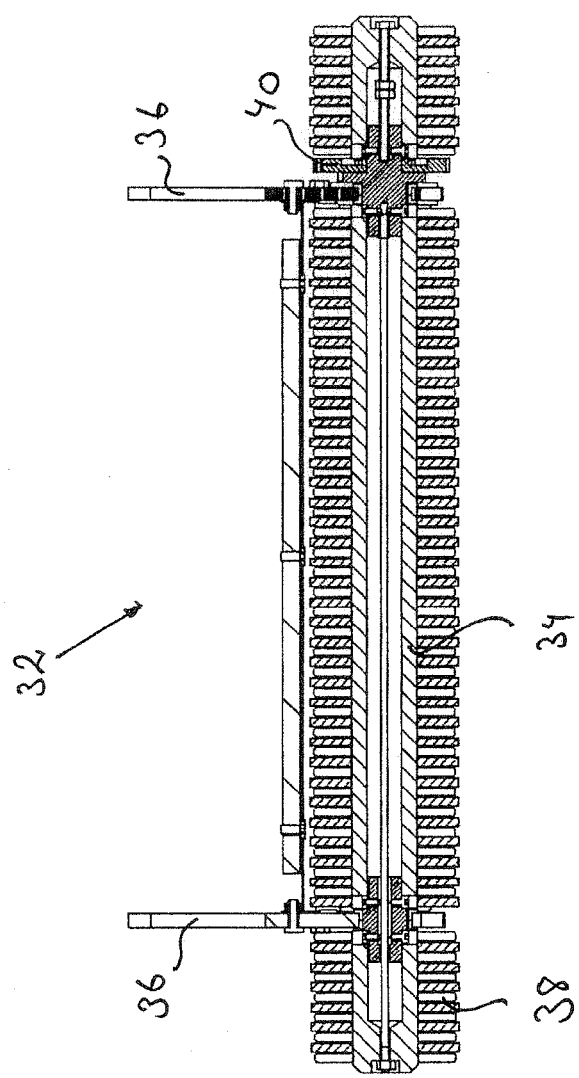

As shown in FIG. 3, each cleaning mechanism 32 comprises an elongated hollow shaft 34. Each elongated hollow shaft 34 is rotatably journalled on fixtures 36 arranged to the device 100. The fixtures 36 are preferably turnably arranged as will be described below. On the shaft 34, cleaning members 38 are arranged, which, in one embodiment, are rotatable and could be tubularly shaped brushes, sponges, scrapes or the like capable of removing dirt, debris and the like on the surfaces to be cleaned. Some examples of different types of cleaning members 38 are shown in FIG. 2. The shaft 34 carrying the cleaning members 38 is rotatably attached to at least one cog wheel 40, which cog wheel 40 in turn is meshed with a drive cog wheel 42, FIG. 2. This drive cog wheel 42 is attached to a drive shaft of an electric motor 44 in turn attached to one of the fixtures 36 of the cleaning mechanisms. Each electric motor 44 is arranged to rotate such that the cleaning members 38 rotate to push the dirt and debris towards the center of the device 100 and thus the nozzle. The overall design of the cleaning mechanisms 32 is to provide a self-supported unit and to minimize the risk of small components entering the reactor pool or similar environments in case of a breakage. This may be seen in the cross-sectional view of FIG. 3. It will be appreciated that since each cleaning mechanism 32 includes a cleaning member 38, the cleaning members 38 also span a width W of the device 100.

As shown in FIGS. 4 and 5, the device 100 according to the invention is further arranged with flotation means 50. The flotation means 50 are adapted to alter the flotation capabilities of the device 100 depending on the cleaning application. In the embodiment shown the flotation means 50 is a volume of material that is capable of altering the flotation capability when submerged in water. In one embodiment, the flotation means 50 is foamed plastic that can hold an amount of air. In one embodiment, the flotation means 50 is a balloon or enclosure that can be filled with air.

Depending on the type of application, different flotation capabilities are desired. FIG. 4 discloses a device according to the present invention when used on a generally horizontal surface. Here it is advantageous that the device 100 just about sinks. When the pump is started, the suction action from the nozzle will steady the device on the horizontal surface and will allow the propelling means to make the device 100 go forward or backward on the surface. Thus there is a certain balance between the suction action and the overall sinking weight of the device.

Further, in this application when the device 100 is used on horizontal surfaces, the cleaning mechanisms 32 will be moved in contact with the surface due to turnable attachment and due to the gravitation.

If the device 100 according to the invention is to be used on generally vertical surfaces, it is advantageous that it just about floats. Then the flotation means 50 is altered to obtain these features, FIG. 5. In one embodiment the volume of foamed plastic is exchanged to another volume having better flotation capabilities. In another embodiment, containing a volume to be filled with air, a larger volume of air may be introduced. Again, in use, the pump 14 is activated, causing a suction action which draws the device against the vertical surfaces to be cleaned. The propelling means are then activated to drive the device up and down along the surfaces.

In this application, a positioning mechanism (not shown) is used in order ascertain a good contact of the cleaning members 38 against the surface to be cleaned since the gravity cannot be used. The positioning means may for example be spiral springs, elastic elements or the like capable of turning the cleaning members 38 against the surface.

For both horizontal and vertical applications, it is preferable to have safety line 52 so that the device 100 may be brought back up after use. The application for vertical surfaces may further be arranged with a support or stand 56, FIG. 5, such that the device 100 may rest in the vertical position when it has reached a horizontal surface.

For both horizontal and vertical applications, a remote control unit is preferably utilized, with which an operator may drive the device 100 during the cleaning action. In this context it is of course feasible to use a monitoring means such as a camera mounted on the device, which will provide the user with visual information.

Also, even if mechanical cleaning members 38 have been described above, it is of course feasible to use other types of cleaning members 38 such as pressurized water jets, pressurized air jets, ultra-sonic waves, pulsed laser to mention a few. Then a number of nozzles may be arranged to cover the width of the device, where the nozzles may be positioned inclined on a rotating carrier so that the jets sweep over the surface. Preferably the jets are also directed such that any removed debris or dirt is directed towards the suction nozzle.

Further possibilities are to equip the device 100 with position monitoring means, whereby the actual position of the device may be obtained. This can be used to monitor the surfaces that have been cleaned and the surfaces that remain to be cleaned. It is further possible to provide the device 100 with additional devices such as sensors and the like for obtaining additional information. The information could for example be radioactive activity at certain locations, the status of welds in the reactor tank, taking samples from the reactor tank, just to mention a few.

It is to be understood that the embodiment described above and shown in the drawings is to be regarded only as a non-limiting example of the invention and that it may be modified in many ways within the scope of the patent claims.

What is claimed is:

1. A movable device for submersibly cleaning surfaces placed in liquid in a nuclear power plant or repository for spent nuclear fuel, the movable device comprising:
   a pump comprising an outlet passage configured to connect with a flexible conduit;
   a nozzle connected to said pump and arranged to face surfaces to be cleaned, the pump creating a suction pressure at the nozzle;
   a first cleaning mechanism and a second cleaning mechanism, each cleaning mechanism configured to remove debris on the surfaces to be cleaned; and
   an adjustable flotation means configured to adjust a flotation capability of the movable device depending on a type of cleaning application;
   wherein the suction from the nozzle will steady the movable device on a horizontal surface, when the device is used on a horizontal surface, and such that the suction action draws the movable device against a vertical surface to be cleaned, when the movable device is used on a vertical surface;
   said nozzle being arranged to collect debris and dirt removed by the first and second cleaning mechanisms;
   wherein each of said first and second cleaning mechanisms comprise cleaning members positioned outside of the nozzle and capable of directing the removed debris towards the nozzle; and
   wherein:
   the first cleaning mechanism is arranged on a first end of the movable device, the first cleaning mechanism has a first elongated rotatable hollow shaft, the first elongated rotatable hollow shaft comprising:
      a first fixture and a second fixture rotatably journalled to the first elongated rotatable hollow shaft,
      a first set of rotatable cleaning members arranged on the first elongated rotatable hollow shaft and positioned around the first fixture and the second fixture;
      a first drive shaft of a first electric motor attached to a first drive cog wheel positioned on at least one of the first fixture and the second fixture such that the first electric motor rotates the first elongated rotatable hollow shaft;
   the second cleaning mechanism is arranged on an opposing second end of the movable device, the second cleaning mechanism has a second elongated rotatable hollow shaft, the second elongated rotatable hollow shaft comprising:
      a third fixture and a fourth fixture rotatably journalled to the second elongated rotatable hollow shaft,
      a second set of rotatable cleaning members arranged on the second elongated rotatable hollow shaft and positioned around the third fixture and the fourth fixture;
      a second drive shaft of a second electric motor attached to a second drive cog wheel positioned on at least one of the third fixture and the fourth fixture such that the second electric motor rotates the second elongated rotatable hollow shaft;
   further wherein the first and second sets of cleaning members facilitate collection of the debris and dirt from two directions.

2. The movable device according to claim 1, wherein said flotation means comprises exchangeable flotation bodies having different flotation capabilities.

3. The movable device according to claim 1, wherein said flotation means comprises a fillable volume capable of containing different volumes of flotation gas.

4. The movable device according to claim 1, wherein the first set and second set of cleaning members are in contact with the surface to be cleaned.

5. The movable device according to claim 1, wherein the first set of cleaning members comprise at least one of brushes, sponges and rakes; and the second set of cleaning members comprise at least one of brushes, sponges and rakes.

6. The movable device according to claim 1, further comprising a remote control system for controlling the driving of the movable device.

7. The movable device according to claim 1, further comprising a positioning system capable of tracking and storing an actual position of the movable device during the cleaning operation.

8. A method of using a movable device for submersibly cleaning surfaces placed in liquid in a nuclear power plant or repository for spent nuclear fuel, the movable device comprising:
   a pump comprising an outlet passage configured to connect with a flexible conduit;
   a nozzle connected to said pump and arranged to face surfaces to be cleaned, the pump creating a suction pressure at the nozzle;
   a first cleaning mechanism and a second cleaning mechanism, each cleaning mechanism configured to remove debris on surfaces to be cleaned;
   an adjustable flotation means configured to adjust a flotation capability of the movable device depending on a type of cleaning application;
   wherein the suction from the nozzle will steady the device on a horizontal surface, when the movable device is used on a horizontal surface, and such that the suction action draws the device against a vertical surface to be cleaned, when the movable device is used on a vertical surface;
   said nozzle being arranged to collect debris and dirt removed by the first and second cleaning mechanisms;

wherein each of said first and second cleaning mechanisms comprise cleaning members positioned outside of the nozzle and capable of directing the removed debris towards the nozzle; and wherein:

the first cleaning mechanism is arranged on a first end of the movable device, the first cleaning mechanism has a first elongated rotatable hollow shaft, the first elongated rotatable hollow shaft comprising:
- a first fixture and a second fixture rotatably journalled to the first elongated rotatable hollow shaft,
- a first set of rotatable cleaning members arranged on the first elongated rotatable hollow shaft and positioned around the first fixture and the second fixture;
- a first drive shaft of a first electric motor attached to a first drive cog wheel positioned on at least one of the first fixture and the second fixture such that the first electric motor rotates the first elongated rotatable hollow shaft; and the second cleaning mechanism is arranged on an opposing second end of the movable device, the second cleaning mechanism has a second elongated rotatable hollow shaft, the second elongated rotatable hollow shaft comprising:
- a third fixture and a fourth fixture rotatably journalled to the second elongated rotatable hollow shaft,
- a second set of rotatable cleaning members arranged on the second elongated rotatable hollow shaft and positioned around the third fixture and the fourth fixture;
- a second drive shaft of a second electric motor attached to a second drive cog wheel positioned on at least one of the third fixture and the fourth fixture such that the second electric motor rotates the second elongated rotatable hollow shaft, each of the first set and second set of cleaning members facilitate collection of the debris and particles from two directions, wherein said method of using the movable device comprises using the movable device such that debris removed by the cleaning members is directed, by the cleaning members, from two opposite sides of the movable device towards the nozzle, and wherein said method of using the movable device comprises using the movable device both for cleaning a horizontal surface and for cleaning a vertical surface and to adjust the flotation means such that the flotation capability is altered depending on whether the horizontal or the vertical surface is cleaned.

* * * * *